US009926030B2

(12) United States Patent
Yamada et al.

(10) Patent No.: US 9,926,030 B2
(45) Date of Patent: Mar. 27, 2018

(54) COWLING STRUCTURE OF STRADDLE-TYPE VEHICLE AND STRADDLE-TYPE VEHICLE

(71) Applicant: Kawasaki Jukogyo Kabushiki Kaisha, Kobe-shi, Hyogo (JP)

(72) Inventors: Masashi Yamada, Akashi (JP); Takumi Uemoto, Kobe (JP)

(73) Assignee: KAWASAKI JUKOGYO KABUSHIKI KAISHA, Kobe-shi, Hyogo (JP)

( * ) Notice: Subject to any disclaimer, the term of this patent is extended or adjusted under 35 U.S.C. 154(b) by 57 days.

(21) Appl. No.: 15/036,381

(22) PCT Filed: Nov. 15, 2013

(86) PCT No.: PCT/JP2013/006732
§ 371 (c)(1),
(2) Date: May 12, 2016

(87) PCT Pub. No.: WO2015/071936
PCT Pub. Date: May 21, 2015

(65) Prior Publication Data
US 2016/0297492 A1    Oct. 13, 2016

(51) Int. Cl.
*B62J 17/00* (2006.01)
*B62J 17/02* (2006.01)
(Continued)

(52) U.S. Cl.
CPC .............. *B62J 17/00* (2013.01); *B62J 17/02* (2013.01); *B62K 11/02* (2013.01); *B62K 11/04* (2013.01)

(58) Field of Classification Search
CPC ........... B62J 17/02; B62J 17/00; B62K 11/02; B62K 11/04
(Continued)

(56) References Cited

U.S. PATENT DOCUMENTS

| 3,971,452 A | 7/1976 | Morelli |
| 4,911,494 A * | 3/1990 | Imai ......................... B62J 17/00 296/180.1 |
| 7,686,369 B2 * | 3/2010 | Matsuo .................... B62J 17/04 296/78.1 |

FOREIGN PATENT DOCUMENTS

| CN | 101423089 A | 5/2009 |
| DE | 2535566 B1 | 9/1976 |

(Continued)

OTHER PUBLICATIONS

ISA Japanese Patent Office, Written Opinion of the International Searching Authority Issued in Application No. PCT/JP2013/006732, dated Feb. 18, 2014, WIPO, 6 pages.

(Continued)

*Primary Examiner* — Joseph D. Pape
(74) *Attorney, Agent, or Firm* — Alleman Hall Creasman & Tuttle LLP (57) ABSTRACT

A cowling structure of a straddle-type vehicle, comprises a front opening forming section formed with a front opening which opens frontward in a vehicle body; a rear opening forming section formed with a rear opening which is placed rearward relative to the front opening and opens to a rear in the vehicle body; an inclined wall which is placed between a lower portion of the front opening forming section and a lower portion of the rear opening forming section, extends in a forward and rearward direction, and includes an inclined surface inclined to be higher as the inclined surfaces extends in a rearward direction; and an outer side wall protruding upward from an outer side portion of the inclined wall in a vehicle width direction of the vehicle body and extending in the forward and rearward direction.

19 Claims, 4 Drawing Sheets

(51) Int. Cl.
*B62K 11/02* (2006.01)
*B62K 11/04* (2006.01)

(58) Field of Classification Search
USPC ........................................................ 296/78.1
See application file for complete search history.

(56) References Cited

FOREIGN PATENT DOCUMENTS

| | | |
|---|---|---|
| DE | 19520515 A1 | 12/1996 |
| EP | 1759969 A1 | 3/2007 |
| EP | 2055619 A1 | 5/2009 |
| EP | 2192033 A1 | 6/2010 |
| JP | S61132481 A | 6/1986 |
| JP | H01172083 A | 7/1989 |
| JP | H218187 A | 1/1990 |
| JP | 2559574 B2 | 12/1996 |
| JP | 2008189177 A | 8/2008 |

OTHER PUBLICATIONS

ISA Japanese Patent Office, International Search Report Issued in Application No. PCT/JP2013/006732, dated Feb. 18, 2014, WIPO, 3 pages.
European Patent Office, Extended European Search Report Issued in European Application No. 13897666.7, dated Aug. 8, 2017, Germany, 8 pages.
State Intellectual Property Office of the People's Republic of China, Office Action Issued in Chinese Application No. 201380080930.6, dated Nov. 6, 2017, 12 pages. (Submitted with English Translation of Search Report).

* cited by examiner

COWLING STRUCTURE OF STRADDLE-TYPE VEHICLE AND STRADDLE-TYPE VEHICLE

TECHNICAL FIELD

The present invention relates to the cowling structure of a straddle-type vehicle, which covers the front portion of a vehicle body, and the straddle-type vehicle including the cowling structure.

BACKGROUND ART

In a motorcycle disclosed in Patent Literature 1, a front cowling is provided to cover a vehicle body from the front side of the upper ends of front forks to the side portions of the vehicle body.

CITATION LIST

Patent Literature

Patent Literature 1: Japanese Laid-Open Patent Application Publication No. S61-132481

SUMMARY OF INVENTION

Technical Problem

In some cases, the motorcycle disclosed in Patent Literature 1 is required to travel more stably at a high speed.

The present invention has been developed to solve the above-described problem, and an object of the present invention is to provide the cowling structure of a straddle-type vehicle which allows the vehicle to travel more stably at a high speed, and the straddle-type vehicle including the cowling structure.

Solution to Problem

To solve the above-described problem, a cowling structure of a straddle-type vehicle of the present invention, comprises a front opening forming section formed with a front opening which opens frontward in a vehicle body; a rear opening forming section formed with a rear opening which is placed rearward relative to the front opening and opens to a rear in the vehicle body; an inclined wall which is placed between a lower portion of the front opening forming section and a lower portion of the rear opening forming section, extends in a forward and rearward direction, and includes an inclined surface inclined to be higher as the inclined surface extends in a rearward direction; and an outer side wall protruding upward from an outer side portion of the inclined wall in a vehicle width direction of the vehicle body and extending in the forward and rearward direction.

When the air flows through the front opening into a region that is rearward relative to the front opening, this air flows along the inclined wall and is discharged to outside the vehicle body through the rear opening. Since the inclined surface of the inclined wall is inclined to be higher as it extends in the rearward direction, the air collides with the inclined surface and thereby a downward force (hereinafter the downward force will be referred to as a "downforce") is generated in the inclined surface, which causes a force pushing down the wheel to a road surface to be generated. Since the rear opening opens to the rear in the vehicle body, the flow of the air from the front opening toward the rear opening can be facilitated, and reduction of the flow velocity of the air can be suppressed. In addition, the outer side wall can prevent the air flowing along the upper portion of the inclined surface from being diverted to the outward region in the vehicle width direction. Therefore, the downforce can be effectively generated in the inclined surface.

To solve the above-described problem, a straddle-type vehicle of the present invention comprises a vehicle body; and the above-described cowling structure of the straddle-type vehicle, which covers a front portion of the vehicle body.

Advantageous Effects of Invention

In accordance with the present invention, since the downforce can be generated effectively in the inclined surface, the straddle-type vehicle can travel more stably at a high speed.

DESCRIPTION OF EMBODIMENTS

Hereinafter, the preferred embodiments of a straddle-type vehicle of the present invention will be described with reference to the accompanying drawings. The directions stated below are from the perspective of a rider straddling the straddle-type vehicle, and a rightward and leftward direction conforms to a vehicle width direction of the vehicle body. Hereinafter, inward (inside) of the vehicle body in the vehicle width direction will be referred to as "inward (inside)," while outward (outside) of the vehicle body in the vehicle width direction will be referred to as "outward (outside)."

First of all, a situation in which it is necessary to apply a downforce to the vehicle body of a straddle-type vehicle 10 of the present embodiment will be described. In the straddle-type vehicle 10, each of side cowlings 44a, 44b is inclined in an outward direction of the vehicle width direction, from its front end portion to its rear end portion, and thereby diverts air flowing toward the rider's legs. The rear end portions of the side cowlings 44a, 44b are located in the vicinity of a radiator core 22a. The air which has flowed through the radiator core 22a flows to a rear region and to a lower region within the vehicle width of the vehicle body, while preventing an interference with the side cowlings 44a, 44b. The side cowlings 44a, 44b serve to guide the air to the radiator core 22a. The front ends of the inner side surfaces of the side cowlings 44a, 44b in the vehicle width direction are located in front of the radiator core 22a. The upper portion of the space formed between the left side cowling 44a and the right side cowling 44b is closed by a head lamp unit 56, a front cowling 42, or the like. An opening is provided between the pair of left and right side cowlings 44a, 44b, to introduce the air into the vehicle body. The radiator core 22a is disposed between the side cowlings 44a, 44b and rearward relative to the front end portions of the side cowlings 44a, 44b. In this configuration, the air is guided in the rearward direction from the front ends of the side cowlings 44a, 44b through the space formed between the side cowlings 44a, 44b. This air is guided to the radiator core 22a without being diverted to an outward region in the vehicle width direction.

If a large amount of air is guided to the space formed between the side cowlings 44a, 44b while the vehicle 10 is traveling at a high speed, the air guided to the space formed between the side cowlings 44a, 44b causes a force for raising a front wheel 26 to be generated in the vehicle 10, so that the grounding load of the front wheel 26 tends to be reduced. In the present embodiment, the front surface of the radiator core 22a and the front surface of the cylinder of an engine 20 are inclined in the rearward direction as they extend in a downward direction. In this structure, the force for raising the front wheel 26 tends to act on the vehicle body. In the present embodiment, by using a front cowling structure 14 which will be described later, the downforce is generated to push down the front cowling 42, by the air which collides with the surface of the front cowling 42 facing upward. In this way, it becomes possible to suppress reduction of the grounding load of the front wheel 26, and easily transmit driving power and a braking force from the front wheel 26 to the road surface, while the vehicle 10 is traveling at a high speed. Since the downforce is generated and the grounding load of the front wheel 26 is increased irrespective of the air guided to the space formed between the side cowlings 44a, 44b, the driving power and the braking force applied from the front wheel 26 to the road surface can be increased, and a traveling performance can be improved.

Figure 1:
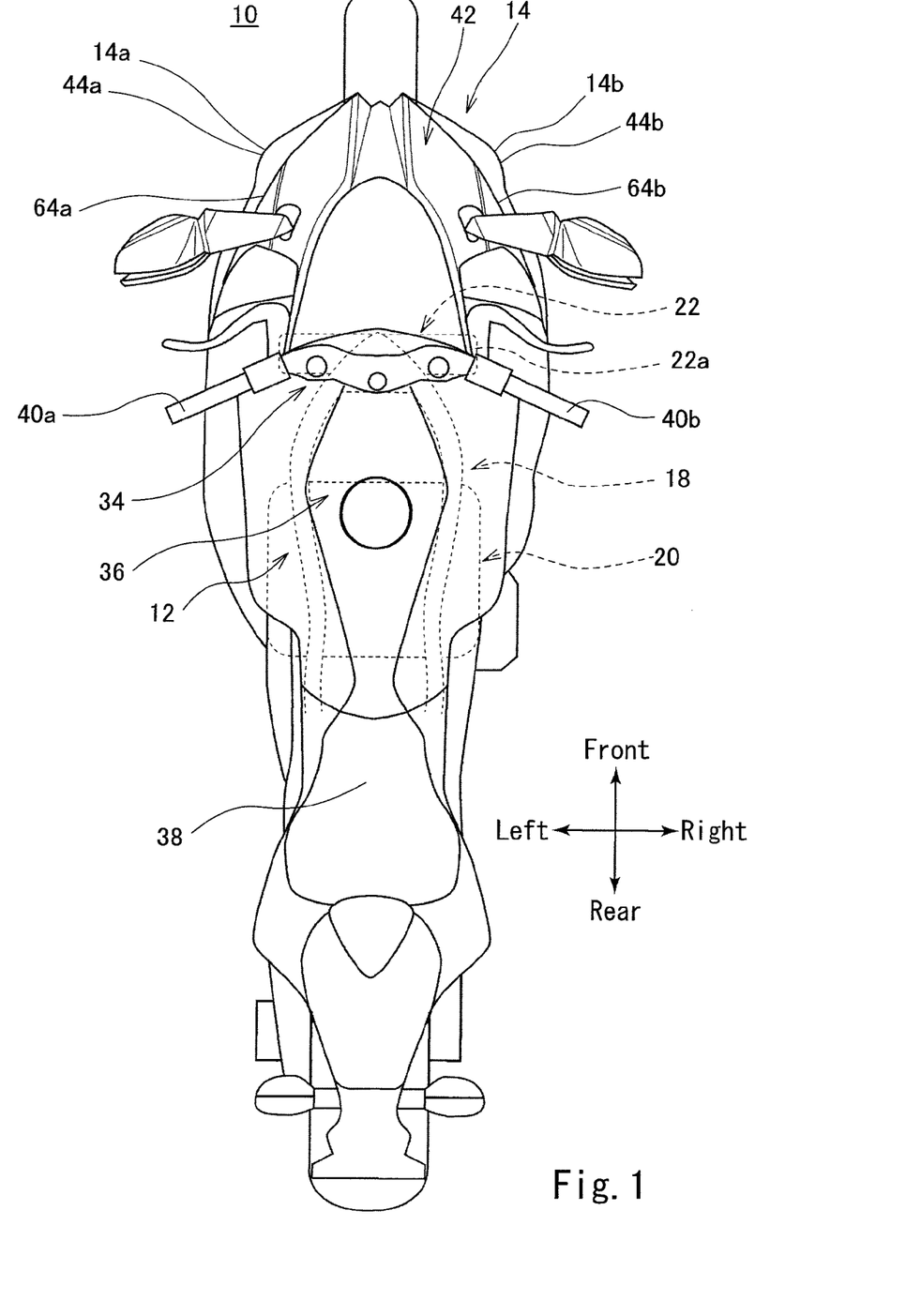
FIG. 1 is a plan view showing the configuration of a straddle-type vehicle according to an embodiment.
Figure 2:
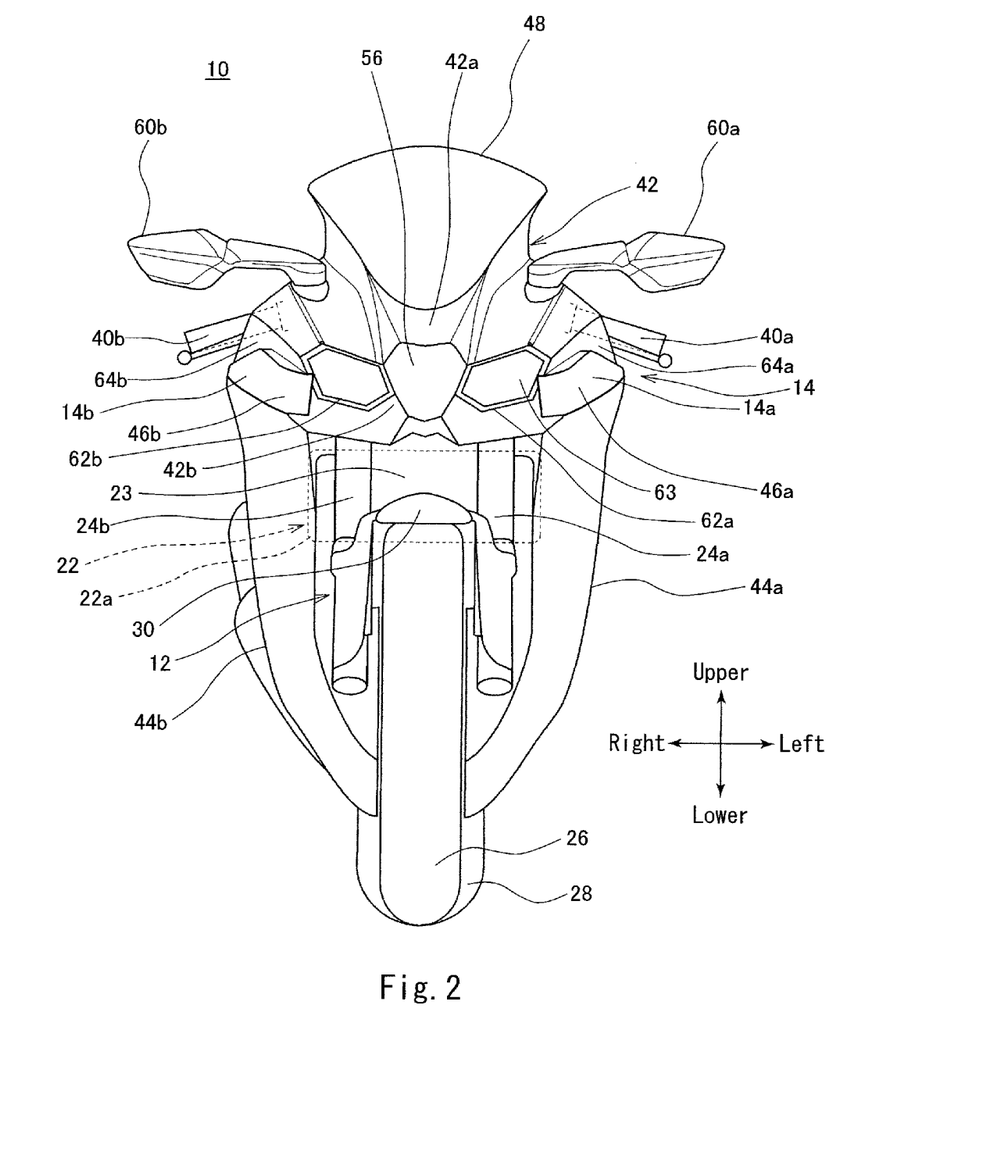
FIG. 2 is a front view showing the configuration of the straddle-type vehicle according to the embodiment.

Hereinafter, the configuration of the straddle-type vehicle 10 or the like will be specifically described. FIG. 1 is a plan view showing the configuration of the straddle-type vehicle 10 according to the embodiment. FIG. 2 is a front view showing the configuration of the straddle-type vehicle 10. The straddle-type vehicle 10 of the present embodiment is a motorcycle and receives the air from the front, while the straddle-type vehicle 10 is traveling. As shown in FIG. 1, the straddle-type vehicle 10 includes a vehicle body 12, and the front cowling structure 14 covering the front portion of the vehicle body 12.

As shown in FIG. 1, the vehicle body 12 includes a vehicle body frame 18, the engine 20 mounted to the vehicle body frame 18, and a cooling device 22 for cooling the engine 20. The cooling device 22 includes the radiator core 22a for performing heat exchange between the air and a coolant which has taken heat out of the engine 20. The radiator core 22a is placed in front of the engine 20 in such a manner that the surface of the radiator core 22a which receives the air faces the front.

As shown in FIG. 2, the vehicle body 12 includes a pair of left and right front forks 24a, 24b provided at the front portion of the vehicle body frame 18 (FIG. 1), the front wheel 26 mounted to the front forks 24a, 24b, a swing arm (not shown) provided at the rear portion of the vehicle body frame 18 (FIG. 1), a rear wheel 28 mounted to the swing arm, and a front fender 30.

As shown in FIG. 1, the vehicle body 12 further includes a steering handle 34, a fuel tank 36 placed rearward relative to the steering handle 34, and a seat 38 placed behind the fuel tank 36. The steering handle 34 is provided with a pair of left and right grips 40a, 40b. The rider straddles the seat 38, grips the grips 40a, 40b, and steers the steering handle 34.

As shown in FIG. 2, the front cowling structure 14 includes the front cowling 42 placed above the front fender 30 and in front of the upper ends of the front forks 24a, 24b, to cover the vehicle body 12, and the pair of left and right side cowlings 44a, 44b placed on the left and right sides of the front forks 24a, 24b, respectively, to cover the vehicle body 12. The front cowling structure 14 is a portion exposed to the front, when the vehicle body is viewed from the front. The front cowling structure 14 may be constituted by a single member, or may include a plurality of members which are coupled to each other. The front cowling structure 14 has an outer shape in which right and left outer edges extend to be spaced apart from each other in an outward direction of the vehicle width direction, from its front end toward its rear portion, and upper and lower outer edges are spaced apart from each other in a vertical direction, from the front end. In the present embodiment, the front cowling structure 14 includes aerodynamic devices 46a, 46b for generating the downforce.

As shown in FIG. 2, the upper surface of the front cowling 42 has an inclined surface 42a which is inclined to be higher as it extends in the rearward direction. The front cowling 42 supports a windshield 48. A pair of left and right side mirrors 60a, 60b are attached to the front cowling 42.

As shown in FIG. 2, the front end portion 42b of the front cowling 42 is formed with a pair of left and right openings 62a, 62b which are opened to the front. In the present embodiment, a ram duct 63 is connected to the left opening 62a. The air taken into the ram duct 63 through the opening 62a is supplied to the engine 20 (FIG. 1) via an air cleaner or the like which is not shown. A radiator opening 23 is provided below the front cowling 42 to supply the air to the radiator core 22a. Alternatively, the ram duct 63 may be connected to the right opening 62b.

As shown FIG. 1, each of the pair of left and right side cowlings 44a, 44b has a plate shape in which it gradually protrudes in the outward direction, from its front end toward its rear portion. As shown in FIG. 2, when the vehicle body is viewed from the side, the side cowlings 44a, 44b are mounted to the vehicle body 12 in such a manner that the upper portions of the side cowlings 44a, 44b overlap with the outer side portions 64a, 64b, respectively, and are apart from the outer side portions 64a, 64b, respectively, in the vehicle width direction. The outer side portions 14a, 14b of the front cowling structure 14 are formed by the side cowlings 44a, 44b, respectively. In this configuration, each of the outer side portions 14a, 14b of the front cowling structure 14 is provided with a swelling section 83 which gradually swells in the outward direction, from its front end toward its rear end, and reduces an air resistance, and a wind deflecting section 81 which diverts in the outward direction the air flowing toward the rider. The front cowling structure 14 includes the outer side portion 14a located on the outer surface in the vehicle width direction. The swelling section 83 is located at the front portion of the outer side portion 14a, and gradually swells in the outward direction of the vehicle width direction, from its front end toward its rear portion. In the present embodiment, the swelling section 83 includes an inclined wall 80, an outer side wall 82, and an upper wall 86. When the vehicle body is viewed from the front, the wind deflecting sections 81 overlap with the rider straddling the vehicle, and are located in front of the rider. To prevent the air from colliding with the rider, the wind deflecting sections 81 are located at relatively outer portions, respectively, of the front cowling structure 14. In the present embodiment, each of the wind deflecting sections 81 includes the side portion of the front cowling 42, and the corresponding side cowling 44a, 44b.

Figure 3:
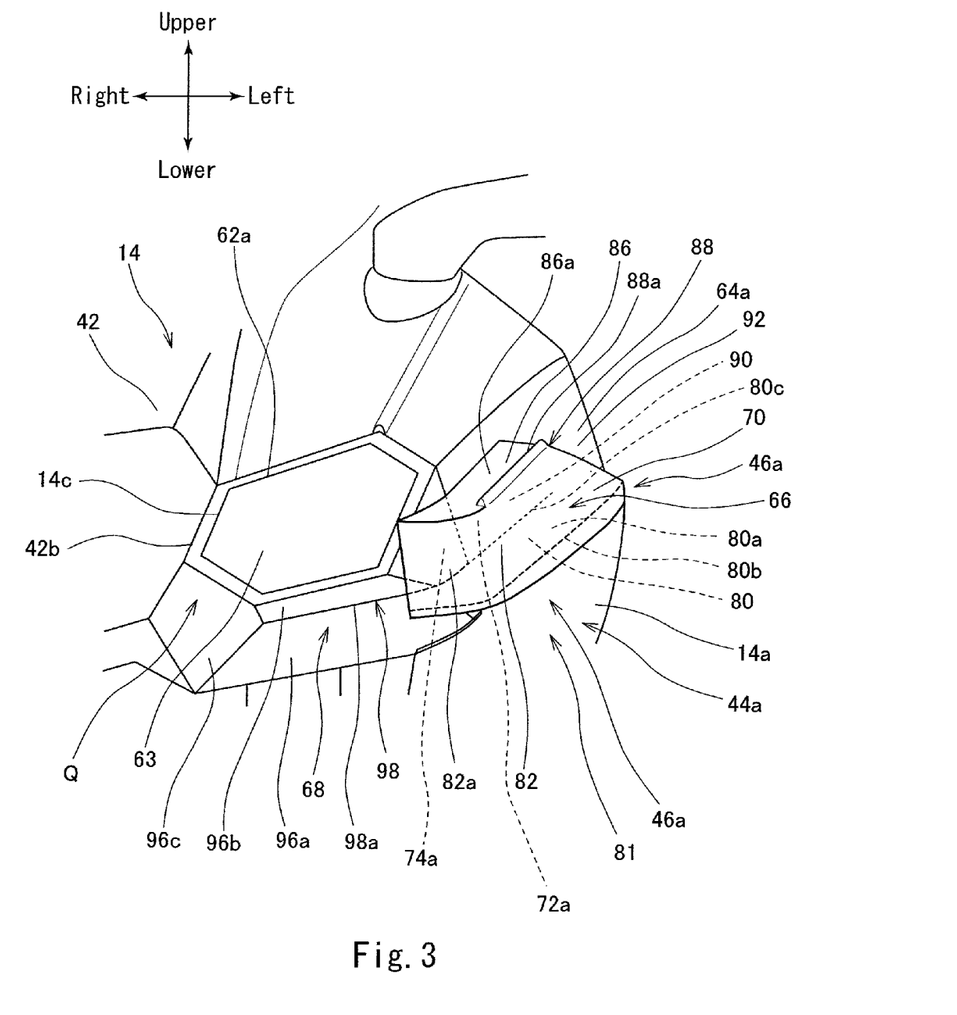
FIG. 3 is a front view showing in an enlarged manner the configuration of a left half part of a cowling structure.
Figure 4:
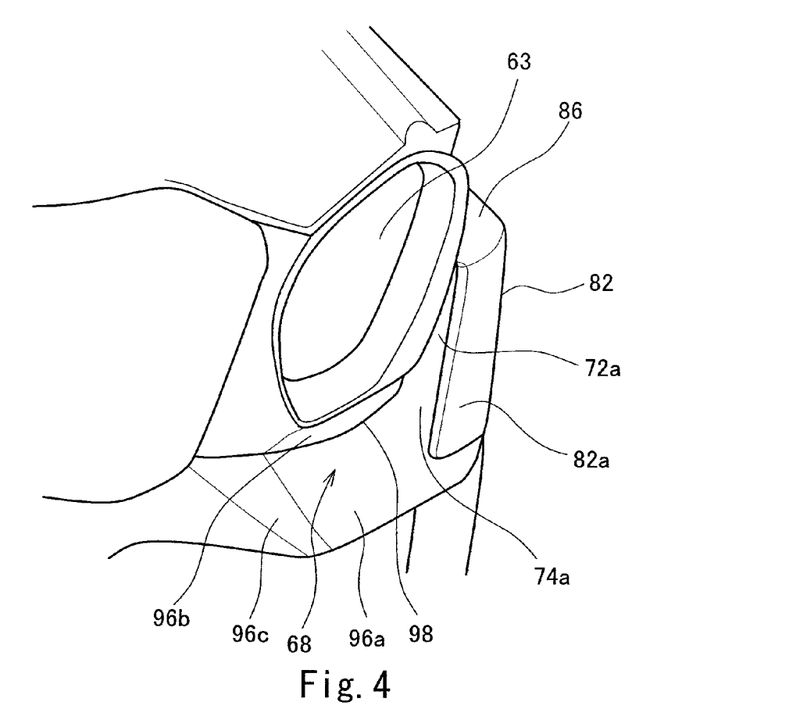
FIG. 4 is a perspective view showing in an enlarged manner the configuration of the left half part of the cowling structure, when viewed from the front and the right.
Figure 5:
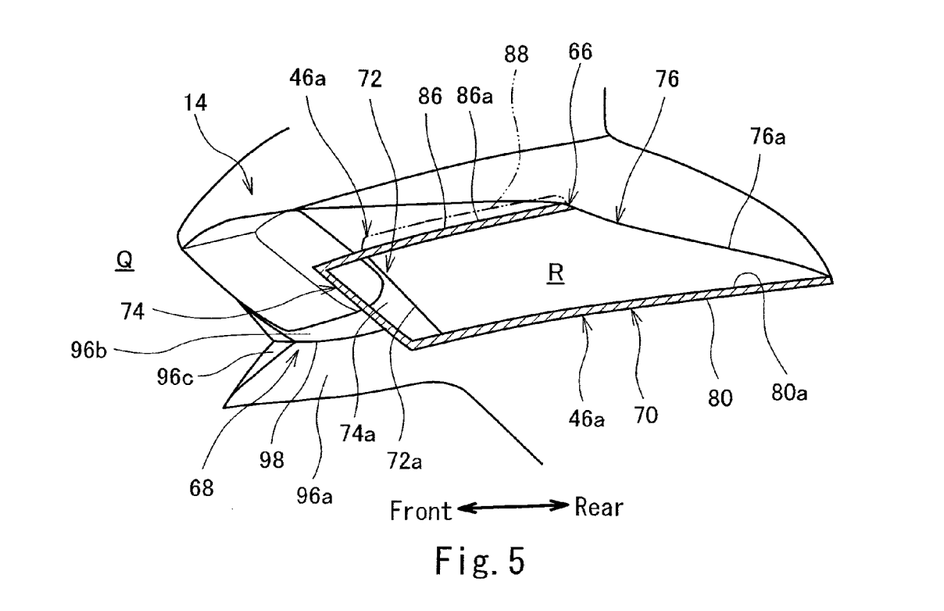
FIG. 5 is a longitudinal sectional view showing the major components of a left aerodynamic device, when viewed from the left.

FIG. 3 is a front view showing the configuration of the aerodynamic device 46a provided at the left half part of the front cowling structure 14. FIG. 4 is a perspective view showing in an enlarged manner the configuration of the left half part of the front cowling structure 14, when viewed from the front and the right. FIG. 5 is a longitudinal sectional view schematically showing the configuration of the left aerodynamic device 46a, when viewed from the left. In the present embodiment, the left aerodynamic device 46a includes the front cowling 42 and the left side cowling 44a, while the right aerodynamic device 46b includes the front cowling 42 and the right side cowling 44b. The left aerodynamic device 46a and the right aerodynamic device 46b are symmetric in the rightward and leftward direction. Hereinafter, regarding the configurations of the aerodynamic devices 46a, 46b, the left aerodynamic device 46a will be mainly described.

As shown in FIGS. 3 and 4, the aerodynamic device 46a includes a lift force generating section 66 which generates the downforce which is a downward lift force, by use of the air, and a guide section 68 which guides the ram air to the lift force generating section 66. The lift force generating section 66 is provided at the outer side portion 14a of the front cowling structure 14. The guide section 68 is provided at the front end portion 14c of the front cowling structure 14. The aerodynamic device 46a is provided at the side portion of the front cowling structure 14 in the vehicle width direction. The aerodynamic device 46a is placed above the radiator opening 23, is provided at the front portion of the front cowling structure 14, and located in front of the front fork 24a, 24b. Since the aerodynamic devices 46a, 46b are placed in front of the front forks 24a, 24b, respectively, moment forces pushing down the front forks 24a, 24b, respectively, can be increased, when the downforces are generated. In this way, the aerodynamic devices 46a, 46b are preferably placed at a location that is as forward as possible. The aerodynamic device 46a is provided at the side portion of the front cowling that is outward relative to the upper surface of the front cowling 42. The aerodynamic device 46a is located rearward relative to the windshield 48 and the side mirror 60a. The aerodynamic device 46a is set to be as high as the handle grip 40a, and laterally relative to the head lamp unit 56.

As shown in FIGS. 3 and 4, the lift force generating section 66 includes a tubular portion 70 having a horizontal cross-section of a substantially rectangular shape. As shown in FIG. 5, the front portion of the tubular portion 70 is provided with a front opening forming section 72 formed with a front opening 72a which opens to the front. A space is formed to allow the space formed in front of the vehicle body and the front opening 72a to be in communication with each other. Through this space, the air flowing in the rearward direction from the front of the vehicle body can be introduced into the front opening 72a. In the same manner, a space is formed to allow the space formed rearward relative to the vehicle body and the rear opening to be in communication with each other. Through this space, the air which has flowed in the rearward direction through the rear opening 76a can be discharged to an outside space formed rearward relative to the vehicle body. An introduction port forming section 74 formed with an introduction port 74a is provided in front of the front opening forming section 72, at the front portion of the tubular portion 70. The introduction port 74a opens to the inside in the vehicle width direction. The introduction port 74a is configured to flow the air which has been guided by the guide section 68, toward the front opening 72a. The rear portion of the tubular portion 70 is provided with a rear opening section 76 formed with the rear opening 76a which opens to the rear in the vehicle body.

As shown in FIG. 5, in the interior of the tubular portion 70, an air passage R is provided to extend over a region from the introduction port 74a to the rear opening 76a, through the front opening 72a. The front opening 72a has an opening area which is smaller than an opening area of the rear opening 76a and smaller than an opening area of the introduction port 74a. In other words, the cross-sectional area of the passage R is reduced at the front opening 72a. Therefore, the flow velocity of the air flowing through the passage R is increased at the front opening 72a.

As shown in FIG. 5, the bottom portion of the tubular portion 70 includes the inclined wall 80 having an inclined surface 80a which is smoothly inclined to be higher as it extends in the rearward direction. The inclined wall 80 is placed to extend continuously between the lower portion of the front opening forming section 72 and the lower portion of the rear opening forming section 76. The inclined surface 80a of the inclined wall 80 is the upper surface of the inclined wall 80. The inclined surface 80a of the inclined wall 80 connects the lower end of the front opening 72a to the lower end of the rear opening 76a in the forward and rearward direction, and extends in the forward and rearward direction. In the present example, the rear opening 72a is placed outward in the vehicle width direction relative to the front opening 72a. Therefore, the inclined surface 80a extends in the outward direction of the vehicle width direction from its front end toward its rear portion. Specifically, the inclined surface 80a is gradually curved in the outward direction of the vehicle width direction as it extends in the rearward direction. The inclined surface 80a of the inclined wall 80 has a shape in which a dimension in the forward and rearward direction is greater than a dimension in the vertical direction. In the present example, the rear end portion of the inclined wall 80a is located rearward relative to the windshield 48. Specifically, the rear end portion of the inclined wall 80a extends to the location of the front fork 24a, 24b in the forward and rearward direction. Since the side surface of the front cowling 42 is formed with the inclined surface 80a, the length of the inclined surface 80a in the forward and rearward direction can be increased easily, compared to a case where the upper surface of the front cowling 42 is formed with the inclined surface. Since the side surface of the front cowling 42 is formed with the inclined surface 80a, it becomes possible to prevent the air discharged from the rear opening 76a from flowing toward the rider. As shown in FIG. 3, in the present embodiment, the inclined wall 80 is integrated with the inner side surface of the side cowling 44a provided at the outer side portion 14a of the front cowling structure 14. In other words, the inclined wall 80 is located inward relative to the swelling section 83. The inclined surface 80a is located outward in the vehicle width direction relative to the windshield 48.

As shown in FIG. 3, an outer side wall 82 protrudes upward from an outer side portion 80b of the inclined wall 80 and extends in the forward and rearward direction. In the present embodiment, the outer side wall 82 is formed by the side cowling 44a provided at the outer side portion 14a of the front cowling structure 14. The outer side wall 82 is located inward relative to the outer side end of the grip 40a attached to the steering handle 34, and above the front wheel 26. The front end portion of the outer side wall 82 is formed with a curved portion 82a which is curved in an inward direction to close the front end of the tubular portion 70. The outer side wall 82 makes it possible to prevent a situation in which the air flowing into the passage R through the introduction port 74a is diverted in the outward direction.

The top portion of the tubular portion 70 is provided with a plate-shaped upper wall 86 having a smooth inclined surface 86a which is inclined to be higher as it extends in the rearward direction. As shown in FIG. 5, the upper wall 86 extends continuously over a region from the introduction port forming section 74 to the rear opening forming section 76 through the front opening forming section 72. The inclination angle of the inclined surface 86a of the upper wall 86 with respect to a horizontal plane is set to be greater than that of the inclined surface 80a of the inclined wall 80 with respect to the horizontal plane. Because of this structure, the opening area of the rear opening 76a is greater than that of the front opening 72a. The rear end of the upper wall 86 is located in front of the rear end of the inclined wall 80. The rear opening 76a is inclined to be lower as it extends in the rearward direction. Because of this structure, the opening area of the rear opening 76a is also greater than that of the front opening 72a. As shown in FIG. 3, in the present embodiment, the upper wall 86 is integrated with the inner side surface of the side cowling 44a, along with the inclined wall 80 and the outer side wall 82. The upper wall 86 makes it possible to prevent the air flowing into the passage R through the introduction port 74a from being diverted in the upward direction.

As shown in FIG. 3, the outer side portion of the upper surface of the inclined surface 86a is formed with a protruding portion 88 protruding in the upward direction and extending in the forward and rearward direction. The protruding portion 88 has a semicircular cross-section (horizontal section). A stepped portion 88a with a height increased in the outward direction is formed by the protruding portion 88. The stepped portion 88a makes it possible to prevent the air flowing along the upper portion of the inclined surface 86a from being diverted in the outward direction. The shape of the cross-section (horizontal section) of the protruding portion 88 is not particularly limited, and may be, for example, a triangular shape, a rectangular shape, or an inverted-L shape.

As shown in FIG. 3, an inner side wall 90 is provided above the inner side portion 80c of the inclined wall 80 to extend in the forward and rearward direction. In the present embodiment, the inner side wall 90 is formed by the outer side portion 64a of the front cowling 42. In this way, a tubular shape with a rectangular cross-section formed with the front opening 72a and the rear opening 76a is formed by the inclined wall 80, the outer side wall 82, the upper wall 86, and the inner side wall 90. This makes it possible to prevent the air introduced through the front opening 72a from leaking to an outside region through a region other than the rear opening 76a. The front opening 72a opens to the front, and has a passage cross-sectional area in which a dimension in the vertical direction is greater than a dimension in the vehicle width direction. This makes it possible to increase the amount of the air introduced through the front opening 72a, while preventing an increase in the size of the vehicle body in the vehicle width direction. The rear opening 76a opens to the rear, and has a passage cross-sectional area in which a dimension in the forward and rearward direction is greater than a dimension in the vehicle width direction. This makes it possible to increase the amount of the air discharged through the front opening 72a, while preventing an increase in the size of the vehicle body in the vehicle width direction. The upper end portion of the front opening 72a is preferably located below the lower end portion of the rear opening 76a. In this configuration, the air travelling horizontally in the rearward direction through a region that is in the vicinity of the upper end portion of the front opening 72a collides with the inclined surface 80a before the air reaches the rear opening 76a, which can easily increase the downforce.

The passage cross-sectional area is gradually reduced from the front opening 72a toward the rear opening 76a. Specifically, the inclined surface 80a has a shape in which a dimension in the vehicle width direction is gradually reduced, as it extends in the rearward direction. This makes it possible to suppress reduction of the flow velocity of the air flowing along the upper portion of the inclined surface 80a, and increase the flow velocity of the air flowing along the upper portion of the inclined surface 80a as the air travels in the rearward direction. In the front cowling structure 14, the aerodynamic devices 46a, 46b are provided in the swelling sections which swell in the outward direction of the vehicle width direction, as the wind deflecting sections 81 which divert the air flowing to a region which is in the vicinity of the handle 34, to an outward region in the vehicle width direction. This makes it possible to obtain the downforce while preventing an undesired increase in the size of the front cowling structure 14 in the vehicle width direction. The inner side wall 90 makes it possible to prevent the air flowing into the passage R through the introduction port 74a from being diverted to an inward region.

As shown in FIGS. 3 and 4, the guide section 68 is configured to guide the air in such a manner that the air which reaches a front region Q is gathered at the front opening 72a. The front region Q is defined as a region which is in front of the front opening 72a. In the present embodiment, the front region Q is located inward in the vehicle width direction relative to the front opening 72a. The guide section 68 is integrated with the front cowling 42 in such a manner that the guide section 68 is located in front of the front opening 72a and inward relative to the front opening 72a. The guide section 68 includes a first guide surface 96a formed below the opening 62a, a second guide surface 96b formed between the upper edge of the first guide surface 96a and the lower edge of the opening 62a, and a third guide surface 96c formed inward relative to the first guide surface 96a and the second guide surface 96b. Each of the first guide surface 96a, the second guide surface 96b and the third guide surface 96c faces the front to receive the air.

The first guide surface 96a is a smooth inclined surface which is inclined to be higher as the first guide surface 96a extends in the rearward direction. The second guide surface 96b is a smooth inclined surface which is inclined to be lower as the second guide surface 96b extends in the rearward direction. A V-shaped groove 98 which is recessed in the rearward direction is formed by the first guide surface 96a and the second guide surface 96b. A trough line 98a of the groove 98 extends in a straight-line shape and is inclined with respect to the vehicle width direction in such a manner that the trough line 98a becomes higher and extends in the rearward direction, as it extends in the outward direction. Since the V-shaped groove 98 is inclined in the upward direction as it extends in the outward direction, the outer portion of the groove 98 guides the air in a greater amount than the inner portion of the groove 98 does. By increasing the depth of the V-shaped groove 98, or inclining the groove 98 in the upward direction, it becomes possible to prevent the air from leaking from the guide section, even when the amount of the air to be guided is increased. The outer end portion of the groove 98 is located inward relative to the introduction port 74a. When viewed from the front, the dimension in the vertical direction and the dimension in the vehicle width direction, of the first guide surface 96a are greater than those of the second guide surface 96b. In addition, the projection area of the first guide surface 96a from the front is greater than that of the second guide surface 96b. The third guide surface 96c is inclined with respect to the vehicle width direction in such a manner that the third guide surface 96c is located at the front as it extends in the inward direction.

Since the outer side portion of the inclined wall 80 in the vehicle width direction is formed with the outer side wall 82 protruding upward, it becomes possible to prevent the air flowing in the rearward direction along the inclined wall 80 from being diverted from the inclined wall 80 to an outward region in the vehicle width direction. In a case where the inclined wall 80 is curved in the outward direction of the vehicle width direction, a force tends to be applied to the outward region in the vehicle width direction, by a centrifugal force. However, since the outer side portion of the inclined wall 80 is formed with the outer side wall 82 protruding upward, it becomes possible to suitably prevent the air from being diverted to the outward region in the vehicle width direction. When viewed from the front, the projection area of the guide section 68 is greater than the area of the front opening 72a. This makes it possible to increase the amount of the air guided to the interior of the front opening 72a, compared to a case where the front opening 72a faces the front. In particular, since the guide section 68 is provided at the front portion of the front cowling structure 14, the air with a high pressure can be guided to the front opening 72a. The above-described trough line of the guide groove 98 preferably has a shape in which the trough line has a greater depth as it extends in the outward direction. The guide groove 98 is located at the lower region of the front portion of the front cowling 42. More specifically, the guide groove 98 is located below the center in the vehicle width direction, of the front portion of the front cowling 42, to be precise, below the head lamp unit 56 or the opening of the ram duct 63. In this structure, the inclined surface 80a of the inclined wall 80 can be extended in the rearward direction from a lower position. This makes it possible to increase the length of the inclined surface 80a in a state in which the angle of the inclined surface 80a is fixed at a predetermined value.

The introduction port 74a has a shape in which a dimension in the vertical direction is greater than a dimension in the forward and rearward direction. The introduction port forming section 74 connects the introduction port 74a to the front opening 72a, and guides the air introduced into the introduction port 74a to the front opening 72a while changing the direction of the air. Specifically, the outer side portions 14a, 14b are formed with the curved surfaces, respectively, extending gradually in the rearward direction, from their front end portions toward outward regions, when viewed from the front. The air gathered by the guide surfaces 96a, 96b, 96c in the above-described manner, can be flowed in the rearward direction, and guided to the front opening, while preventing reduction of the flow velocity of the air. In addition, since the introduction port forming section 74 is formed with the curved surface, the front opening 72a can be covered when viewed from the front. As a result, the external appearance of the vehicle can be improved.

Although in the present embodiment, the second guide surface 96b is made lower as it extends in the rearward direction, the second guide surface 96b may extend in a direction perpendicular to the horizontal plane, or may be made higher as it extends in the rearward direction. In a case where the second guide surface 96b is made higher as it extends in the rearward direction, the inclination angle of the second guide surface 96a is desirably set to be greater than that of the first guide surface 96a, to form the V-shaped groove 98.

While the straddle-type vehicle 10 of FIG. 2 is traveling, the front cowling structure 14 receives the air from the front. The air flows from the front of the front cowling structure 14 and reaches the front region Q. The first guide surface 96a suppresses the air from being diverted in the downward direction. The second guide surface 96b suppresses the air from being diverted in the upward direction. The third guide surface 96c suppresses the air from being diverted in the inward direction. A part of the air which has reached the front region Q is thus gathered at the groove 98. This air is guided in the outward direction by the groove 98. The direction of the part of the air is changed by the introduction port forming section 74. The air is supplied to the front opening 72a through the introduction port 74a. As shown in FIG. 5, the air supplied to the front opening 72a flows through the front opening 72a and into a region which is rearward relative to the front opening 72a. The air flows along the upper portion of the inclined surface 80a and flows in the rearward direction to a region outside the vehicle body through the rear opening 76a. Since the inclined surface 80a is inclined to be higher as it extends in the rearward direction, the air collides with the inclined surface 80a and thus the downforce is generated. This makes it possible to prevent the front wheel 26 (FIG. 2) from coming off the ground. As a result, the straddle-type vehicle 10 can travel more stably at a high speed.

As shown in FIG. 5, since the rear opening 76a opens to the rear in the vehicle body, it becomes possible to prevent the air flowing from the front opening 72a toward the rear opening 76a from becoming stagnant or stuck. Thus, movement of the air can be facilitated, and reduction of the flow velocity of the air can be suppressed. Since the passage R located above the inclined surface 80a is constituted by the tubular portion 70, it becomes possible to suppress the air from being diverted from the passage R to regions which are above and below the passage R and to regions which are inward and outward in the vehicle width direction relative to the passage R. Further, since the air is gathered by the guide section 68, the air which collides with a region with an area greater than that of the front opening can be guided to the front opening. This makes it possible to increase the pressure (flow rate) of the air supplied to the front opening 72a. Moreover, the flow velocity of the air can be increased at the front opening 72a having a reduced cross-sectional area. Therefore, the air flowing at a high speed can collide with the inclined surface 80a. In this way, the downforce can be generated effectively.

As shown in FIG. 5, the introduction port forming section 74 has the first introduction port 74a which is located in front of the front opening 72a and opens to the inside in the vehicle width direction, while the guide section 68 is located inward relative to the front opening 72a and the introduction port 74a and in front of the front opening 72a and the introduction port 74a. In this structure, the air gathered by the guide section 68 is easily guided from the introduction port 74a to the front opening 72a. As shown in FIG. 3, since the outer side wall 82 of the aerodynamic device 46a is constituted by the side cowling 44a, 44b, the dimension of the guide section 68 in the vehicle width direction can be increased. The guide section 68 is capable of gathering a large amount of air. Since the guide section 68 is integrated with the front cowling 42 (FIG. 3), the number of members can be reduced.

As shown in FIGS. 3 and 4, the first guide surface 96a of the guide section 68, the inclined surface 86a of the aerodynamic device 46a, and the inclined surface 42a of the front cowling 42 are inclined to be higher as they extend in the rearward direction. Therefore, the downforce can also be generated by the collision of the air with the first guide surface 96a, the inclined surface 86a, and the inclined surface 42a.

As shown in FIG. 2, since the aerodynamic devices 46a, 46b are provided at the outer side surfaces of the left and right outer side portions 64a, 64b of the front cowling 42, the downforce can be well balanced in the vehicle width direction. Since the outer side wall 82 (FIG. 3) is located inward relative to the outer side end of the grip 40a attached to the steering handle 34 (FIG. 1) and above the front wheel 26, a bank angle is not reduced.

A part of the air which has reached the front region Q (FIG. 3) collides with the first guide surface 96a and thereby flows in the upward direction. This air flows into the ram duct 63 through the opening 62a. Therefore, a greater amount of air can be supplied to the engine 20 (FIG. 1).

As shown in FIG. 1, since each of the outer side portions 14a, 14b of the front cowling structure 14 constitutes the swelling section 83 which swells gradually in the outward direction, from its front end toward its rear portion, when viewed from above, the air resistance can be reduced. In addition, since each of the outer side portions 14a, 14b of the front cowling structure 14 constitutes the wind deflecting section for diverting to the outward region, the air flowing toward the rider, the air which collides with the rider can be reduced, and the fatigue of the rider can be mitigated. As shown in FIG. 3, the outer side wall 82, the inclined wall 80 and the upper wall 86 of the aerodynamic device 46a are integrated with the side cowling 44a constituting the wind deflecting section, the number of members can be reduced. Thus, an air resistance reduction effect, a wind deflecting effect, and a stable traveling effect can be obtained with a simplified configuration. In addition, it becomes possible to suppress the outer side wall 82, the inclined wall 80, and the upper wall 86 from interfering with the components of the front cowling 42. The aerodynamic devices 46a, 46b are set to be about as high as the grips 40a, 40b of the handle 34, respectively, and are located in front of the grips 40a, 40b, respectively, for example, below the side mirrors 60a, 60b, and above the radiator opening 23. In this layout, the air flowing to a region which is in the vicinity of the handle 34 can be reduced. Thus, the wind deflecting effect and the generation of the downforce can be realized.

As shown in FIG. 3, since the outer side surface of the outer edge portion and the outer side surface of the outer side wall 82, of the front cowling structure 14, are formed as a common surface, it becomes possible to suppress turbulence of the air flowing along the outer side surface of the outer edge portion of the front cowling structure 14. Since the outer side surface of the outer edge portion and the outer side surface of the outer side wall 82 are formed as the common surface, no stepped portion is formed and hence the external appearance is not marred.

As shown in FIG. 3, although in the above-described embodiment, the inclined wall 80 is integrated with the side cowling 44a, the inclined wall 80 may be integrated with the front cowling 42, or may be formed independently of each of the side cowlings 44a, 44b and the front cowling 42.

Although in the above-described embodiment, the inclined surface 80a extends to be curved in the outward direction of the vehicle width direction, from its front end toward its rear portion, the inclined surface 80a may extend in a straight line shape in the outward direction of the vehicle width direction. Further, the inclined wall 80 may extend in a direction parallel to the forward and rearward direction. The air flowing along the inclined surface 80a is preferably deflected to the outward region in the vehicle width direction while the air is flowing from the front opening 72a to the rear opening 76a. Although in the above-described embodiment, the outer side wall 82 deflects the air flowing along the inclined surface 80a to the outward region in the vehicle width direction, the inner side wall 90 may deflect the air depending on the shape of the inclined surface 80a. For example, the front opening 72a may be located at the intermediate portion of the front cowling structure 14 in the vehicle width direction. In this case, the air introduced into the front opening 72a is guided in the outward direction of the vehicle width direction by the inner side wall 90, and discharged through the rear opening 76a. Such a case may be included in the present invention. In this case, the guide section may be formed at a location that is outward in the vehicle width direction relative to the front opening 72a or on the right and left sides of the front opening 72a in the vehicle width direction.

As described above, it is sufficient that the guide section is adjacent to the front opening 72a in the vehicle width direction. It is sufficient that the guide section is provided with the inclined wall 80 and the outer side wall 82. A guide section which does not include a wall located above the inclined wall 80 is also included in the present invention. A guide section provided only on one of the right and left sides of the vehicle body is also included in the present invention. Further, a vehicle which does not include the ram duct 63 is also included in the present invention. The aerodynamic devices 46a, 46b may be provided at the upper surface of the front cowling 42 or the side surfaces of the side cowlings 44a, 44b. Since the inclined wall 80 is provided at a portion which diverts the air from the rider for a wind deflecting purpose, the wind deflecting effect can be obtained and the downforce can be generated. The vehicle 10 can travel more stably at a high speed while reducing a burden on the rider. Since the inclined wall 80 is located inward relative to the outer edge portion of the front cowling structure 14, the turbulence of the air flowing through a region that is in the vicinity of the outer edge of the front cowling structure 14 can be prevented, and an increase in the air resistance can be suppressed. The cross-sectional area of the passage R at the front opening 72a may not be reduced.

The straddle-type vehicle of the present invention may be applied to a straddle-type three-wheeled vehicle or a straddle-type four-wheeled vehicle, as well as the motorcycle of the above-described embodiment.

REFERENCE CHARACTER LIST 10 straddle-type vehicle (motorcycle)
12 vehicle body
14 cowling structure of straddle-type vehicle
72 front opening forming section
72a front opening
76 rear opening forming section
76a rear opening
80 inclined wall
80a inclined surface
80b outer side portion
82 outer side wall

The invention claimed is:

1. A straddle-type vehicle, comprising:
a vehicle body; and
a cowling structure provided to cover a front portion of the vehicle body, the cowling structure including a front cowling and a tubular portion that forms an air passage through which air flows,
the tubular portion including:
a front opening forming section formed with a front opening which opens frontward in the vehicle body;
a rear opening forming section formed with a rear opening which is placed rearward relative to the front opening and opens to a rear in the vehicle body;
an inclined wall which is placed between a lower portion of the front opening forming section and a lower portion of the rear opening forming section, extends in a forward and rearward direction, and includes an inclined surface inclined to be higher as the inclined surface extends in a rearward direction; and
an outer side wall protruding upward from an outer side portion of the inclined wall in a vehicle width direction of the vehicle body and extending in the forward and rearward direction, wherein
the tubular portion is provided on an outer surface on the front cowling, and the rear opening forming section of the tubular portion terminates at a front side of a rear edge of the front cowling;
the inclined surface of the inclined wall has a shape in which a dimension in the forward and rearward direction is greater than a dimension in a vertical direction; and
the tubular portion has a passage cross-section of a vertically elongated shape.

2. The straddle-type vehicle according to claim 1,
wherein the cowling structure includes a wind deflecting section which diverts air flowing toward a rider to an outward region in the vehicle width direction,
wherein the inclined wall is provided at the wind deflecting section.

3. The straddle-type vehicle according to claim 1,
wherein the cowling structure includes a swelling section which is provided at the outer side portion in the vehicle width direction, and swells gradually in an outward direction of the vehicle width direction from a front end of the swelling section toward a rear portion of the swelling section, when viewed from above,
wherein the inclined wall is placed inward in the vehicle width direction of the vehicle body relative to the swelling section.

4. The straddle-type vehicle according to claim 3,
wherein an outer side surface of the outer side portion and an outer side surface of the outer side wall, in the vehicle width direction of the vehicle body, are formed as a common surface.

5. The straddle-type vehicle according to claim 1,
wherein the cowling structure includes a guide section which is provided in front of the front opening and guides air in such a manner that the air which reaches a region that is in front of the front opening is gathered at the front opening.

6. The straddle-type vehicle according to claim 5,
wherein the guide section is placed inward in the vehicle width direction of the vehicle body relative to the front opening.

7. A straddle-type vehicle, comprising:
a vehicle body; and
a cowling structure provided to cover a front portion of the vehicle body, the cowling structure including:
a front opening forming section formed with a front opening which opens frontward in the vehicle body;
a rear opening forming section formed with a rear opening which is placed rearward relative to the front opening and opens to a rear in the vehicle body;
an inclined wall which is placed between a lower portion of the front opening forming section and a lower portion of the rear opening forming section, extends in a forward and rearward direction, and includes an inclined surface inclined to be higher as the inclined surface extends in a rearward direction; and
an outer side wall protruding upward from an outer side portion of the inclined wall in a vehicle width direction of the vehicle body and extending in the forward and rearward direction,
wherein the cowling structure includes a guide section which is provided in front of the front opening and guides air in such a manner that the air which reaches a region that is in front of the front opening is gathered at the front opening,
wherein the guide section is placed inward in the vehicle width direction of the vehicle body relative to the front opening,
wherein the cowling structure includes an introduction port forming section formed with an introduction port which is located in front of the front opening and opens to an inside in the vehicle width direction of the vehicle body, and
wherein the introduction port forming section deflects the air guided by the guide section to flow to an outward region in the vehicle width direction, toward the front opening.

8. The straddle-type vehicle according to claim 1,
wherein the front opening has an opening area smaller than an opening area of the rear opening.

9. The straddle-type vehicle according to claim 1,
wherein the vehicle body includes a steering handle provided with a grip,
wherein the cowling structure is configured to include an aerodynamic device which generates a downforce, and
wherein the aerodynamic device is set to be as high as the grip, and is located in front of the grip.

10. The straddle-type vehicle according to claim 9,
wherein the aerodynamic device is mounted to a swelling section of the cowling structure, the swelling section being configured to swell in an outward direction of the vehicle width direction.

11. The straddle-type vehicle according to claim 1,
wherein the cowling structure is configured to include an aerodynamic device which generates a downforce, and
wherein the aerodynamic device is provided at each of side portions of the cowling structure in the vehicle width direction.

12. The straddle-type vehicle according to claim 3, further comprising:
a windshield supported by the cowling structure,
wherein a rear end portion of the inclined wall is located rearward relative to the windshield.

13. The straddle-type vehicle according to claim 3,
wherein the vehicle body includes a vehicle body frame and a front fork provided at a front portion of the vehicle body frame, and wherein a rear end portion of the inclined wall extends to a location of the front fork in the forward and rearward direction.

14. The straddle-type vehicle according to claim 3,
wherein the vehicle body includes a vehicle body frame and a front fork provided at a front portion of the vehicle body frame,
wherein the cowling structure includes side cowlings for covering the vehicle body on right and left sides of the front fork, respectively, and
wherein the inclined wall is integrated with an inner side surface of each of the side cowlings.

15. A straddle-type vehicle, comprising:
a vehicle body; and
a cowling structure provided to cover a front portion of the vehicle body, the cowling structure including:
a front opening forming section formed with a front opening which opens frontward in the vehicle body;
a rear opening forming section formed with a rear opening which is placed rearward relative to the front opening and opens to a rear in the vehicle body;
an inclined wall which is placed between a lower portion of the front opening forming section and a lower portion of the rear opening forming section, extends in a forward and rearward direction, and includes an inclined surface inclined to be higher as the inclined surface extends in a rearward direction; and
an outer side wall protruding upward from an outer side portion of the inclined wall in a vehicle width direction of the vehicle body and extending in the forward and rearward direction,
wherein the cowling structure includes a guide section which is provided in front of the front opening and guides air in such a manner that the air which reaches a region that is in front of the front opening is gathered at the front opening,
wherein the cowling structure includes an introduction port forming section formed with an introduction port which is located in front of the front opening and opens to an inside in the vehicle width direction of the vehicle body, and
wherein the introduction port forming section deflects the air guided by the guide section to flow to an outward region in the vehicle width direction, toward the front opening.

16. The straddle-type vehicle according to claim 15,
wherein the cowling structure includes a wind deflecting section which diverts air flowing toward a rider to the outward region in the vehicle width direction, and
wherein the inclined wall is provided at the wind deflecting section.

17. The straddle-type vehicle according to claim 15,
wherein the cowling structure includes a swelling section which is provided at the outer side portion in the vehicle width direction, and swells gradually in an outward direction of the vehicle width direction from a front end of the swelling section toward a rear portion of the swelling section, when viewed from above, and
wherein the inclined wall is placed inward in the vehicle width direction of the vehicle body relative to the swelling section.

18. The straddle-type vehicle according to claim 17,
wherein an outer side surface of the outer side portion and an outer side surface of the outer side wall, in the vehicle width direction of the vehicle body, are formed as a common surface.

19. The straddle-type vehicle according to claim 15,
wherein the front opening has an opening area smaller than an opening area of the rear opening.

* * * * *